United States Patent
Svedman

(10) Patent No.: US 10,185,610 B2
(45) Date of Patent: Jan. 22, 2019

(54) METHOD AND SYSTEM FOR ADJUSTING THE MAXIMUM DURATION OF TIME-CRITICAL FUNCTIONS

(71) Applicants: ZTE WISTRON TELECOM AB, Kista (SE); ZTE (TX) INC., Austin, TX (US)

(72) Inventor: Patrick Svedman, Kista (SE)

(73) Assignee: ZTE TX INC., Plano, TX (US)

( * ) Notice: Subject to any disclaimer, the term of this patent is extended or adjusted under 35 U.S.C. 154(b) by 31 days.

(21) Appl. No.: 14/392,277

(22) PCT Filed: Jun. 24, 2014

(86) PCT No.: PCT/US2014/043861
§ 371 (c)(1),
(2) Date: Dec. 23, 2015

(87) PCT Pub. No.: WO2014/209995
PCT Pub. Date: Dec. 31, 2014

(65) Prior Publication Data
US 2016/0196171 A1    Jul. 7, 2016

Related U.S. Application Data

(60) Provisional application No. 61/838,631, filed on Jun. 24, 2013.

(51) Int. Cl.
*G06F 11/00* (2006.01)
*G06F 11/07* (2006.01)
(Continued)

(52) U.S. Cl.
CPC .......... *G06F 11/076* (2013.01); *G06F 11/079* (2013.01); *G06F 11/0736* (2013.01);
(Continued)

(58) Field of Classification Search
CPC .. G06F 11/076; G06F 11/0736; G06F 11/079; G06F 11/0703; G06F 11/0709;
(Continued)

(56) References Cited

U.S. PATENT DOCUMENTS 6,985,937 B1 * 1/2006 Keshav .................. G06F 9/505
370/231
8,467,349 B2    6/2013 Agashe et al.
(Continued)

FOREIGN PATENT DOCUMENTS

| JP | 2010-171834 | 8/2010 |
|---|---|---|
| JP | 2011-529663 | 12/2011 |
| WO | WO 2008/087724 | 7/2008 |

OTHER PUBLICATIONS

Cormen et al., "Introduction to Algorithms", 3rd edition, MIT Press, 2009.
(Continued)

*Primary Examiner* — Bryce P Bonzo
*Assistant Examiner* — Anthony J Amoroso
(74) *Attorney, Agent, or Firm* — Duane Morris LLP

(57) ABSTRACT

An improved method and system for achieving target function failure rates for time-critical functions. Communication systems often utilize distributed functions occurring in two or more nodes. Various embodiments of the invention enable such system to achieve target function failure rates by adjusting the maximum allowable duration for time-critical functions. Adjustments to either a function starting time or a maximum allowable function duration may be used to achieve target failure rates. Various embodiments measure a real-time function failure rate. Other embodiments simply lengthen or compress the maximum allowable function
(Continued)

duration based on failure or success of the function. The function duration or the function duration statistics do not need to be known.

20 Claims, 4 Drawing Sheets

(51) Int. Cl.
H04L 29/14 (2006.01)
H04L 29/08 (2006.01)
H04L 1/00 (2006.01)

(52) U.S. Cl.
CPC ............... *H04L 1/00* (2013.01); *H04L 29/14* (2013.01); *H04L 67/325* (2013.01); *H04L 69/40* (2013.01)

(58) Field of Classification Search
CPC ............ G06F 11/0712; G06F 11/0766; G06F 11/0793; G06F 11/142; G06F 11/1443; G06F 11/30; G06F 11/3006; G06F 11/301; G06F 11/3055; G06F 11/3065; G06F 9/50; G06F 9/505; G06F 9/5077; H04L 1/00; H04L 29/14; H04L 47/10; H04L 47/14; H04L 67/32; H04L 67/325; H04L 69/40; H04W 80/04; H04J 3/0635; H04J 3/0638; H04J 3/0682
See application file for complete search history.

(56) References Cited

U.S. PATENT DOCUMENTS

| 2007/0076723 | A1* | 4/2007 | Chen ................. H04L 47/10 370/395.4 |
| 2007/0124731 | A1 | 5/2007 | Neiman et al. |
| 2011/0128883 | A1 | 6/2011 | Chung et al. |
| 2011/0164587 | A1* | 7/2011 | Seo ................... H04L 1/1671 370/329 |
| 2013/0028127 | A1 | 1/2013 | Zheng et al. |

OTHER PUBLICATIONS

Dahlman, Parkvall, Sköld, "4G LTE/LTE-Advanced for Mobile Broadband", Academic Press, 2011.
Fadali, Sam, "Digital Control Engineering", Academic Press, 2009.
International Search Report in international application No. PCT/US14/43861, dated Dec. 31, 2014, in 4 pages.
Manolakis, Ingle, "Applied Digital Signal Processing", Cambridge University Press, 2011.
NEC and Telecom MODUS, "Selection of MCS levels in HSDPA," 3GPP TSG RAN WG1 Technical document, R1-01-0589, May 2001.
Written Opinion of the International Searching Authority in international application No. PCT/US14/43861, dated Dec. 31, 2014, in 5 pages.

* cited by examiner

METHOD AND SYSTEM FOR ADJUSTING THE MAXIMUM DURATION OF TIME-CRITICAL FUNCTIONS

RELATED PATENT APPLICATIONS

This application is a 371 National Phase application of International Application No. PCT/US2014/03861, filed on Jun. 24, 2014 which claims benefit of priority under 35 U.S.C. § 119(e) to Provisional Application No. 61/838,631, entitled "Method and Apparatus to Adjust Maximum Duration of Time-Critical Functions," filed Jun. 24, 2103, each of which is incorporated by reference herein in its entirety.

FIELD OF THE INVENTION

The present invention relates generally to automated, time critical functions and systems that perform time critical functions.

BACKGROUND OF THE INVENTION

Modern industrial processes often include one or more time critical functions that are controlled by centralized or distributed control systems. This may include functions performed in automated manufacturing and assembly processes, computer networking, content distribution, and communication systems, to name but a few. Modern wireless communication systems are particularly relevant because such systems include numerous functions that must be carried out to support operations such as channel allocation, live communication, and call hand-off, which across a communication network are executed millions of times per second.

At the simplest level, a function is an operation that involves a set of specific actions (e.g. processing on a data input to generate a data output). An algorithm is one example of a function. See, Cormen et al, "Introduction to Algorithms", $3^{rd}$ edition, MIT Press, 2009, for an explanation of algorithms. Communication systems are built around numerous functions. For example, one such function is the scheduling procedure in a multi-user wireless 4G communication system. See, Dahlman, Parkvall, Sköld, "4G LTE/LTE-Advanced for Mobile Broadband", Academic Press, 2011, for an explanation of 4G LTE communications systems.

In systems like communication systems, many functions are performed repeatedly and continuously. Also, such systems may have multiple simultaneous active instances of a function at a given moment in time (e.g. the parallel execution of the same algorithm with different inputs on multiple cores in a multicore processing unit). Typically, it takes a finite amount of time to perform the actions of the function. This time is referred to as the processing time. This time may be deterministic, that is, the same for a given input, or it may be random.

Throughout this disclosure and in the claims that follow the term "node" is used in the context of functions. Actions such as data processing, data input or output in a function often takes place in or are executed by a node. A node can be a processor, a processor core, a digital signal processor (DSP), a circuit board, a computer, a radio base station, combinations of these, or some other suitable structure. In other words, nodes may exist on many hardware levels and on many levels of abstraction.

A distributed function is a kind of function that involves actions occurring in a plurality of nodes, where at least two of the nodes are physically and/or logically separated. Two nodes are distributed if the output of one node cannot be immediately input to the other node. In a distributed function, there is a positive time delay D between the output of one node and the corresponding input to the next node. As used in this disclosure and in the claims that follow, the physical and/or logical link between two nodes is referred to as the backhaul and the positive time delay for data to travel over the backhaul is referred to as the backhaul delay. Backhaul delays may be deterministic or random. If deterministic, the backhaul delay may be known or unknown. Otherwise, if the backhaul delay is random, then its statistical properties (or a part of them) may be known or unknown. For example, the backhaul delay may be random, but the average delay and variance may be known with at least some accuracy. In one example, the backhaul is over the Internet where the delay is random because packets are subject to variations in delay time known as jitter.

Functions, including distributed functions, typically start at a certain time, called the starting time. Time in this context may be discrete or continuous. For example, in an LTE communication system, time can be discretely measured in sub-frames, since transmissions need to be done according to the sub-frame timing and pattern. The time that a function finishes its operations is referred to as the function completion time. The completion of a function can involve the output of a result and can also signify that the final action of the function is finished. For example, a sorting algorithm completes when the input has been sorted and stored in memory. Another example is a scheduling procedure in an LTE communication network, which can be seen as completed when the scheduling decision has been properly distributed.

An exemplary distributed function is illustrated in FIG. 1. The function 100 of FIG. 1 is comprised of two nodes, 1 and 2, interconnected by a backhaul link. The dotted line surrounding the function 100 is purely symbolic and is not intended to define any physical boundary. In this function 100, after the function starts, some processing occurs in node one that generates an output. The output travels over the backhaul to node 2 where further processing occurs before the function completes.

The time between the starting time and completion time, which includes the processing time at each node and the backhaul delay, is called the duration of the function. The duration of the function may also be deterministic or random due to processing and/or backhaul delays. The time-line of a distributed function such as that shown in FIG. 1 is illustrated in FIG. 2.

FIG. 2 provides an example timeline for a distributed function with two distributed nodes. Operation of the function starts in node 1 at starting time $T_0$. While in node 1, actions 1.1, 1.2 and 1.3 are performed to complete the sub-function process of node 1. This results in an output that is sent to node 2 over the backhaul. After a backhaul delay, node 2 receives its input and proceeds with action 2.1. The function completes when action 2.1 is finished. The time between starting time in node 1 and completion time in node 2 is measured on the timeline marked duration.

Communication system functions are often time-critical. A time-critical function is one that must be completed before a certain completion deadline expires. If the completion occurs after the completion deadline expires, then a function failure occurs. A function failure can be more or less severe in different systems, however, generally it has a negative impact on the system. Similarly, if a time-critical function completes in time, then a function success occurs. Note that a function failure or success in the context of this disclosure relates to function completion before the completion deadline, not to any other notion of failure or success.

Given a starting time and a completion deadline, a time-critical function has a maximum duration called the maximum duration. If the function takes a longer time (the duration) than the maximum duration, then a function failure occurs. One example of a time-critical function is the downlink scheduling of a certain sub-frame in an LTE communication system. The scheduling decision needs to be made and properly distributed in the system before the sub-frame starts, so that the decision and the data can be properly transmitted in the designated sub-frame. If the scheduling and transmission preparation of the sub-frame does not complete before the sub-frame starts, then there is a function failure. Such a failure likely results in wasted radio resources and reduced system performance.

FIG. 3 is a timeline that illustrates data flow in a two node distributed communication system with backhaul delay usable with various embodiments of the invention. The example shown in FIG. 3 is a function that performs downlink scheduling in an LTE communication system. In this exemplary function, the scheduling of sub-frame n is performed in node 1 and node 2 is the transmitter. The two nodes are connected with a backhaul link.

The downlink scheduling function of sub-frame n begins in node 1 at the point on timeline for node 1 marked as the starting time. After a delay due to the required processing time to make a scheduling decision, the decision is send from node 1 to node 2 over the backhaul. The time difference between when the decision is send from node 1 and when it is received by node 2 is the backhaul delay Node 2 receive the decision at the time after the function starting time equal to node 1's processing time plus the backhaul delay. Node 2 also requires a certain amount of processing time to prepare and complete the transmission based on the received scheduling decision. Node 2's operations cease at the completion time indicated on the timeline for node 2. The scheduling decision needs to be received in node 2 with sufficient time before sub-frame n, so that there is adequate time to prepare the transmission. If this happens, it results in a function success. If the completion time of the function is after the completion deadline, for example due unusually long backhaul delay, then there is a function failure.

In another example, consider the random access procedure in LTE. A UE transmits a preamble in a certain sub-frame (the starting time). The response must be transmitted by the network within a certain configurable time-window (before the end of the time-window, i.e. the completion deadline). If the UE does not receive the response within this time-window, it considers the random access attempt a failure (a function failure). This is illustrated in FIG. 4, where the function is distributed and performed in three nodes (Node 1, Node 2 and Node 3). The starting time is for example the beginning of the subframe where a random access preamble may be transmitted by UEs. The preamble detection is performed in the receiver in Node 1. A preamble detection result is then sent over a backhaul to Node 2, where a scheduler is located. The response is scheduled and the scheduling decision is sent over the backhaul to Node 3, where a transmitter is located. The transmission of the response needs to be prepared before the actual transmission. This needs to be completed before the start of the subframe where the response is to be transmitted (the completion deadline), otherwise a function failure occurs.

FIG. 4 is a timeline that illustrates data flow in a three node distributed communication system with backhaul delay usable with various embodiments of the invention. In FIG. 4, node 1 is an uplink receiver, node 2 is a scheduler and node 3 is a downlink transmitter. The nodes are connected with backhaul links. The function in this example are part of a random access procedure such as that employed in an LTE communication system. A random access preamble is detected in node 1. The detection results are sent over the backhaul to node 2. The time between when the detection results are sent from node 1 and when they are received at node 2 is a positive backhaul delay identified as $d_1$ in FIG. 4. After receipt, node 2 performs a scheduling process that results in a scheduling decision suing the detection results received from node 1. Node 2 sends the scheduling decision over the backhaul to the transmitter at node 3. The time between when node 2 sends the scheduling decision and when it is received at node 3 is backhaul delay $d_2$. The transmitter and node 3 prepares the transmission using the received scheduling decision and completes its transmission at the end of the completion time shown on the node 3 timeline. If a response can be transmitted by node 3 before the corresponding completion deadline (e.g. the last sub-frame in the corresponding random access response window in LTE), then the function is deemed to have succeeded. Otherwise, if the completion time of the function is after the completion deadline, the function is deemed to have failed and in the LTE example of FIG. 4, the random access procedure cannot proceed.

For systems such as those depicted in FIGS. 2-4, it would be desirable to have a mechanism to optimize the system to achieve an acceptable target function failure rate without having to explicitly estimate the statistical or other properties of a random or unknown function duration.

SUMMARY OF THE INVENTION

The present invention provides systems and methods applicable to time-critical functions in distributed systems such as wireless communication systems. In accordance with various embodiments of the present invention, such time-critical functions are considered to fail if they don't complete before a completion deadline. In various embodiments of the invention, time-critical functions are distributed functions comprised of two or more distributed nodes. In various embodiments, distributed means that the nodes are physically or logically separated such that there is a positive delay time from the output of one node to the input of another node. In various embodiments, this delay time may be deterministic and in other embodiments it may be random.

Various embodiments of the invention provide methods and systems for dynamically adjusting a function's maximum allowable duration to achieve a target function failure rate. In various embodiments of the invention, methods and systems are provided that adjust a function's maximum duration dynamically, based on the function's statistical or historical successes and failures, in order to meet a target function failure rate. The maximum duration is adjusted by adapting the starting time and/or the completion deadline of the function to achieve a target function failure rate. In various other embodiments, the target function failure rate is achieved by adjusting the maximum duration based on the outcome of each iteration of the distributed function. In various embodiments this comprises lengthening the maximum duration if the function fails and shortening the maximum duration if the function succeeds.

These and other features and embodiments of the present invention, as well as the structure and operation of various embodiments of the present invention are described in detail below with reference to the accompanying drawings.

BRIEF DESCRIPTION OF THE DRAWINGS

The present invention, in accordance with one or more various embodiments, is described in detail with reference to the following Figures. These drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

The approach of the present invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the spirit or scope of the invention.

Generally, the invention is directed toward time critical functions. In some embodiments, the invention is directed to time critical functions that are also distributed. More specifically, some embodiments of the invention are directed to time critical, distributed functions performed in a communication system. Even more specifically, the invention is directed to systems and methods for achieving a target function failure rate for such functions. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, with other time critical functions, depending upon specific design and other needs.

Figure 1:
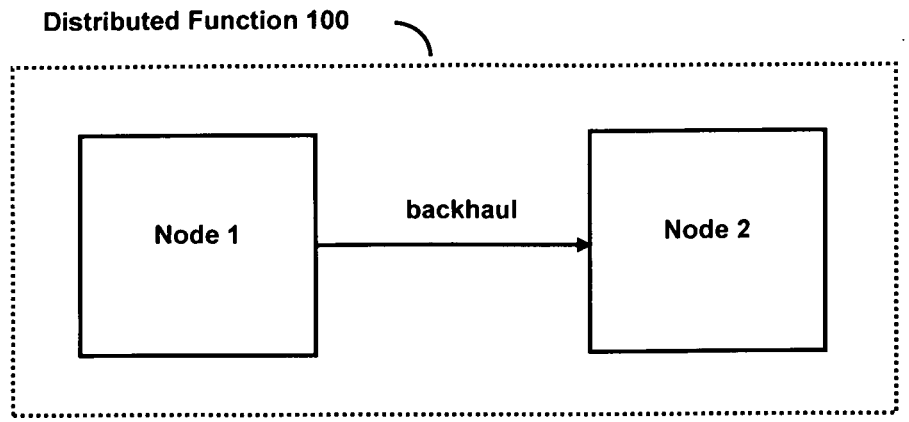
FIG. 1 is a block diagram depicting an exemplary distributed function usable with various embodiments of the invention.
Figure 2:
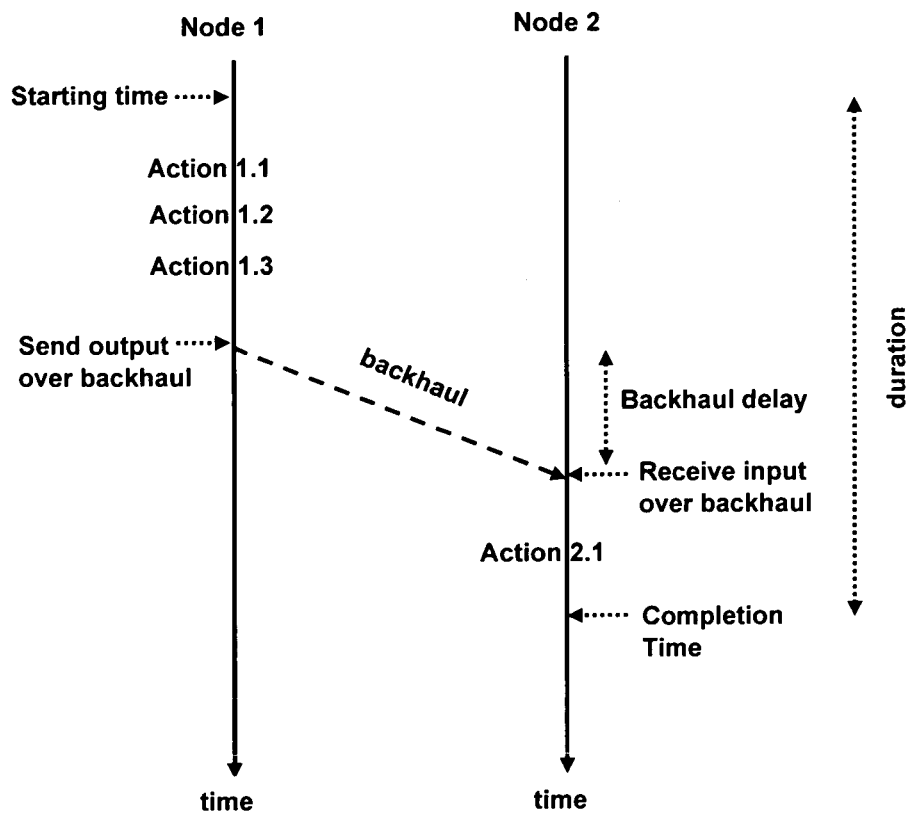
FIG. 2 is a timeline that illustrates data flow in a two node distributed function with backhaul delay usable with various embodiments of the invention.
Figure 3:
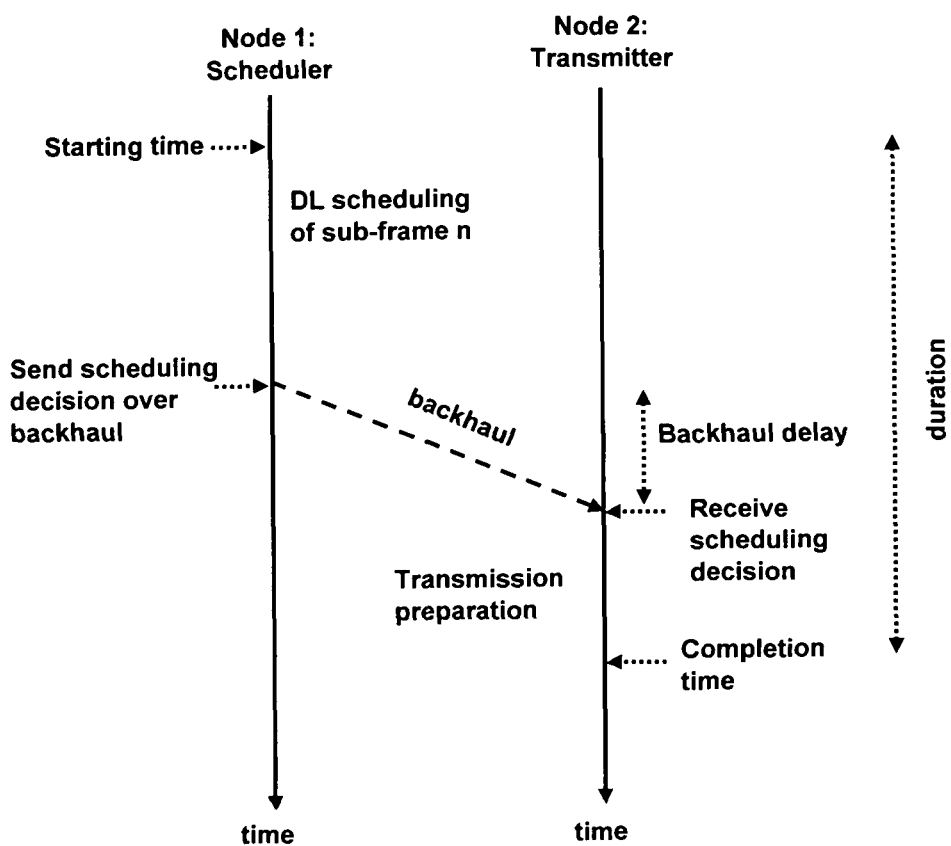
FIG. 3 is a timeline that illustrates data flow in a two node distributed communication system function with backhaul delay usable with various embodiments of the invention.
Figure 4:
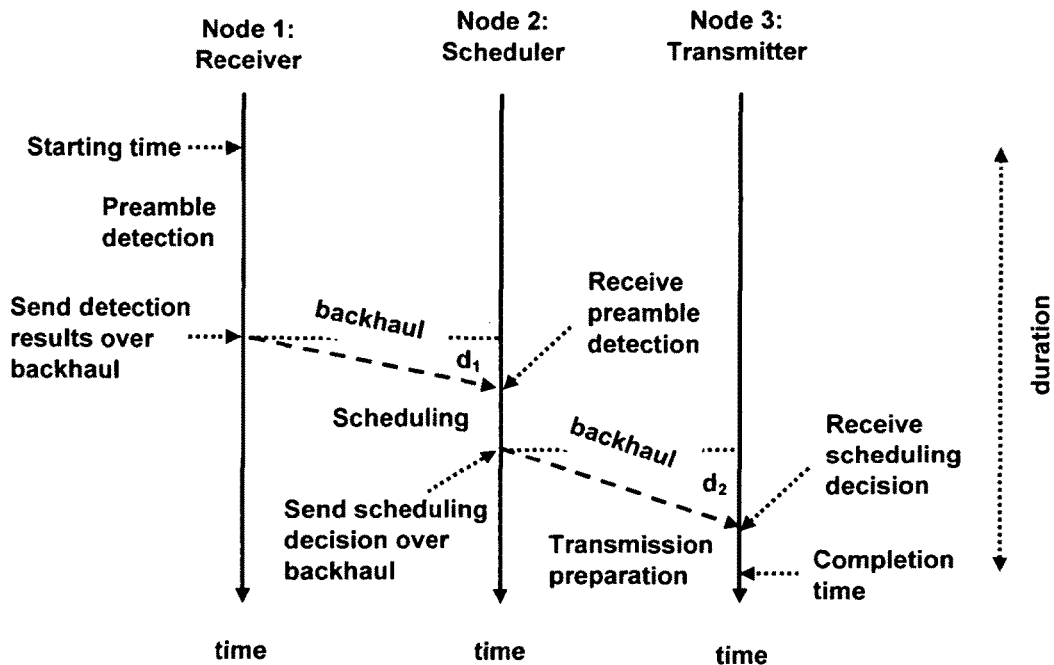
FIG. 4. is a timeline that illustrates data flow in a three node distributed communication system function with backhaul delay usable with various embodiments of the invention.
Figure 5:
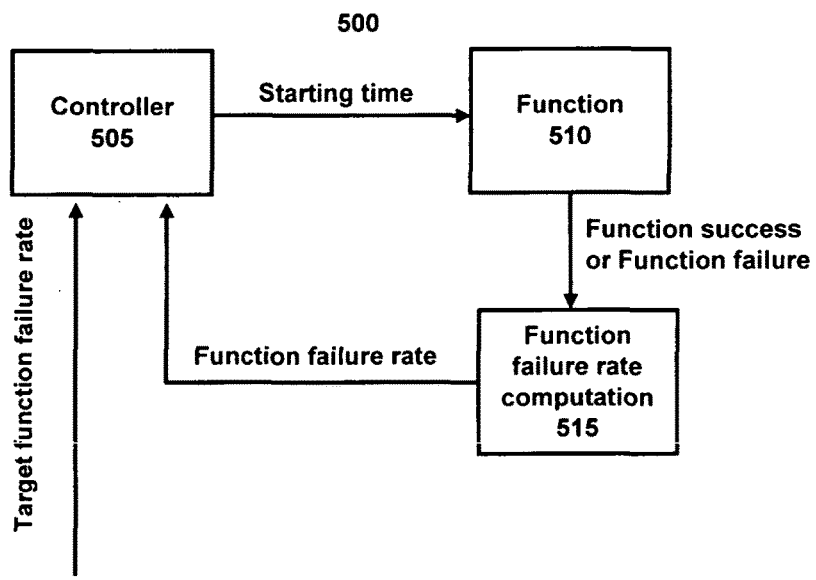
FIG. 5. is a functional block diagram illustrating the iterative steps performed by a distributed function to achieve a target function failure rate according to various embodiments of the invention.

Referring now to FIG. 5, this figure depicts a functional block diagram for a system for achieving a target function failure rate in a distributed function according to various embodiments of the invention. In FIG. 5, a controller 505 accepts a target function failure rate as an input as well as an observed or actual function failure rate via a feedback loop. Such a function could be in almost any type of automated process.

In real-world applications, it may be infeasible or costly to design a system so that the failure probability is zero, in particular if some properties of the system are random. Therefore, in many systems, a small positive failure rate may be tolerated or acceptable. Similarly, standard-compliant functions within a communication network may allow for a small positive function failure rate. Once a target function failure rate is defined, systems should strive to meet the target rate as closely as possible balancing function speed against failure rate. Note also, that function failure rates below the target function failure rate (i.e. rates that are too low), should be avoided, since this may result in an unnecessarily early starting time for a function, or may overly utilize system and/or processing resources, both of which may have negative impact on system performance.

In one embodiment, for time-critical functions that are performed repeatedly, the function failure rate is the ratio of the number of function failures to the total number of times the time-critical function has been performed. In various embodiments of the invention, the function failure rate may be computed in a certain time window, with equal weight given to each time the function was performed. In various embodiments, the function failure rate may be computed with a finite impulse response (FIR) filter. In various other embodiments, the function failure rate may be computed with an infinite impulse response (IIR) filter. For an explanation of FIRs and IIRs see Manolakis, Ingle, "Applied Digital Signal Processing", Cambridge University Press, 2011.

Referring back to FIG. 5, in various embodiments, a controller 505 controls the starting time of a function for purposes of deterring a maximum function duration, such as, for example, by sending a function start signal to initiate the function 510. The maximum duration of a function is defined as the time difference between the starting time and the completion deadline. The maximum duration can be adjusted by changing the starting time, the completion deadline, or both. In various embodiments, the function 510 of FIG. 5 may take the form of one or more of the various distributed functions shown in FIGS. 1-4.

After the function in block 510 has completed, the result is either function success or function failure. As discussed herein, in various embodiments, a function is deemed to have succeeded if it is completed before the expiration of a completion deadline, and fails if it does not complete before that time. In various embodiments, a signal representing success or failure is output by the function or some other structure not shown to a function failure rate computation module 515. In various embodiments, the function failure rate computation module 515 may keep a running total of the function failure for that function.

In various embodiments, the function failure rate computation module 515 may supply the latest computed function failure rate as an input to the control module 505 each time an iteration of the function 500 occurs. Therefore, the function failure rate and target function failure rate can be input to a controller, such as controller 505 in FIG. 5, which aims to reduce the difference between the measured function failure rate and the target function failure rate by dynamically adjusting the starting time. In various embodiments, the control module 505 may also compare the computed function failure rate to a target function failure rate also input to the controller 505 to determine whether to adjust the maximum function duration. In various embodiments, the controller 505 will use the mechanisms available to it to lengthen or shorten the maximum function duration. In various embodiments, this includes lengthening the maximum function duration by either starting the function earlier (in continuous time) or configuring the system so that the completion deadline is moved later. Note that a completion deadline cannot be moved dynamically in each use of the function.

In various embodiments, the controller 505 may move the starting time P×Δ time units earlier each time the function failure rate is updated, where P is a positive constant and Δ is the difference between an actual observed function failure rate and the target function failure rate. According to this formula, when the actual rate exceeds the target rate the start time will be moved earlier, whereas if the actual rate is less than the target rate, the starting time will be moved later thereby shortening the maximum duration. In various embodiments, in the system and method shown in FIG. 5, each time the function failure rate is updated, the controller 505 updates the starting time, with the goal of achieving a function failure rate as close as possible to the target function failure rate. Although in the embodiment shown in FIG. 5, both the controller 505 and the function failure rate computation module 515 are associated with a particular function 510, it will be appreciated by those of ordinary skill in the art that the module 515, as well as the controller 505, may support multiple functions without departing from the spirit or scope of the invention.

In general, the function failure rate of a given function can be reduced by increasing the function's maximum duration. Doing so provides more room for unpredictable variations in the duration to occur without the function failing (i.e., exceeding the maximum function duration before completing). For example, the function failure rate of downlink scheduling in an LTE communication system can be reduced by starting the scheduling earlier, giving more room for random variations in the backhaul delay if the function is distributed. By contrast, the failure rate of a function is generally increased by reducing the maximum duration because this provides less time for such variations.

As discussed above, in certain circumstances, the amount of backhaul delay in a function may be random or unknown. Therefore, in embodiments subject to random or unknown delay, it may be necessary to estimate the time of duration of individual processes in a function to determine the appropriate maximum duration. Determining the maximum duration may be performed by a controller, such as controller 505 in FIG. 5 or may be determined by or provided by other structure and supplied as an input to the controller 505 as shown in FIG. 5.

Other embodiments of the invention avoid the need to estimate the time duration of actions in nodes or the backhaul delay. In such embodiments, neither the individual times nor the total duration need to be estimated or known beforehand. Instead, a starting time of the function may be adjusted to achieve a certain target function failure rate as iterations of the function occur over time. In such embodiments, the selection of an appropriate target function failure rate may be determined based on desired system performance characteristics. For example, in some embodiments, there may be external requirements on the failure rate such as a defined failure rate in a communication standard specification. In other embodiments, the target function failure rate that maximizes the system performance can be determined by external computer simulation and supplied to the system as an input.

In various embodiments such as that shown in FIG. 5, the function failure rate is measured or calculated in the function failure rate computation module 515. In other embodiments, as discussed in greater detail below in the context of FIG. 6, a target function failure rate is achieved without measuring the rate. In various embodiments, these two methods are used in parallel functions. In other embodiments, they are used serially, alternating back and forth between measuring the failure rate and not measuring it.

As an example of completion deadline adjustment in a communication system, consider a part of a random access scheduling function in an LTE network. The completion deadline in such a function is given by the last subframe in the random access response window. In LTE, the random access response window can be reconfigured, which means that the completion deadline can be adjusted in relation to the subframe where the corresponding random access preamble was transmitted (e.g., the starting time). With a longer random access response window, the maximum duration of the function becomes larger, whereas a shorter random access response window would result in a smaller maximum function duration.

As discussed above, in various other embodiments, the function failure rate may not be explicitly measured. However, even without measuring the failure rate, it is still possible to design a control system that aims to reduce the difference between the actual function failure rate and the target function failure rate by dynamically adjusting the starting time. For example, methods similar to CRC-based ("ACK/NACK-based") link adaptation in wireless communications can be used. For an explanation of CRC-based link adaptation see NEC, Telecom MODUS, "Selection of MCS levels in HSDPA," 3GPP TSG RAN WG1 Technical document, R1-01-0589, 2001-05 at example method 3.

Instead of using an estimated function failure rate as an input to the controller, the individual result (function success or function failure) of each function execution is used as input. In one embodiment, the starting time is adjusted each time a function success or function failure is obtained, as follows: if a function failure occurs, move the starting time D time-units earlier; if a function success occurs, move the starting time D*(target function failure rate/(1−target function failure rate) time-units later, where D is a positive number. In one embodiment, the number D determines a trade-off between how rapidly the controller reacts to changes is the function failure rate versus noisiness in the starting time. A small D gives will provide a smooth starting time that reacts slowly to abrupt changes in the function failure rate. A large D gives a noisy starting time that can react more rapidly to a sudden divergence between the function failure rate and the target function failure rate. In various embodiments, an appropriate value of D can be determined externally by computer simulation and supplied to the system. In one embodiment, the starting time may be a discrete time variable. This can be handled for example by adapting an intermediate (continuous) starting time variable as above, which is then rounded towards the nearest valid starting time, which is then used by the function. Note that in this approach, the function failure rate is not explicitly measured anywhere. An embodiment of the invention without explicit function failure rate measurement is illustrated in the context of FIG. 6.

Figure 6:
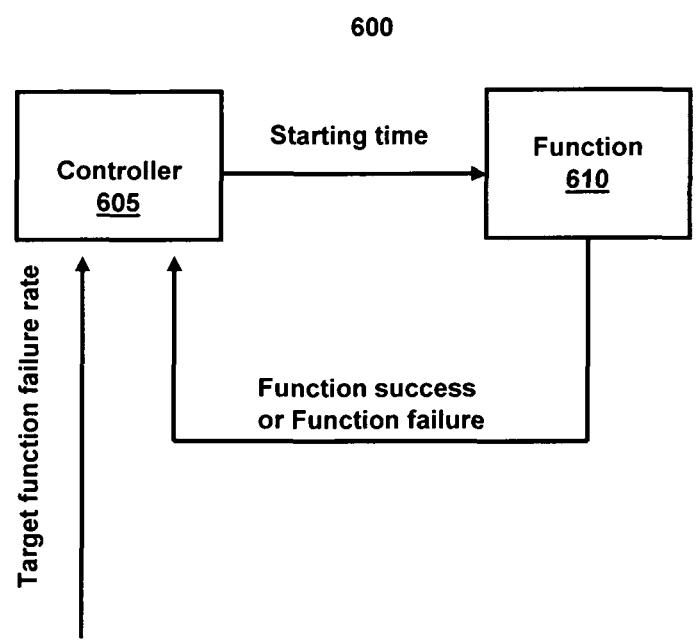
FIG. 6 is a functional block diagram illustrating the iterative steps performed by a distributed function to achieve a target function failure rate according to various other embodiments of the invention.

FIG. 6 is a functional block diagram illustrating the iterative steps performed by a distributed function module to achieve a target function failure rate according to various other embodiments of the invention. In FIG. 6, the system 600 includes a controller 605 that adjusts the starting time and therefore the maximum duration of the function 610. Each time the function is executed and function outcome is obtained (i.e., success or failure), the function result is input to the controller 605. The controller 605 updates the starting time of the next execution of the function with the goal of achieving a function failure rate as close as possible to the target function failure rate.

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Although specific terms are employed herein, they are used in a generic and descriptive sense only and not for purposes of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by one or more appropriately configured modules located in one or more nodes as described above. As used herein, a "module" can refer to hardware firmware, software and any associated hardware that executes the software, and any combination of these elements for performing the associated functions described herein. Additionally, as would be apparent to one of ordinary skill in the art, the various modules may be discrete modules; however, two or more modules may be combined to form a single module that performs the associated functions, or the functions of a single module may be divided among two or more modules, according to various embodiments of the invention.

Additionally, one or more of the functions described in this document may be performed by means of computer program code that is stored in a "computer program product," "non-transitory computer-readable medium," and the like, which is used herein to generally refer to media such as, memory storage devices, or storage units. These, and other forms of computer-readable media, may be involved in storing one or more instructions for execution by a processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What is claimed is:

1. A method of achieving a target function failure rate for a time-critical computing function, comprising:
   executing the time-critical computing function; and
   adjusting, at the time-critical computing function, a maximum allowable function duration based on past function failures and successes until the target function failure rate is achieved by adjusting a function starting time by an increment of time that is based on the target function failure rate,
   wherein a function failure occurs when the time-critical computing function fails to complete by a function completion deadline, and
   wherein the target function failure rate comprises a ratio of a number of function failures to a total number of times the time-critical computing function has been performed.

2. The method of claim 1, wherein the time-critical computing function is a distributed function comprising actions occurring in two or more distributed nodes.

3. The method of claim 2, wherein the distributed nodes are connected over a backhaul with a positive backhaul delay.

4. The method of claim 1, wherein adjusting the maximum allowable function duration based on past function failures and successes comprises adjusting based on a measured function failure rate.

5. The method of claim 1, wherein adjusting the maximum allowable function duration comprises adjusting based on failure or success of one or more previous iterations of the time-critical computing function.

6. The method of claim 5, wherein adjusting based on failure or success of one or more previous iterations of the time-critical computing function comprises increasing the maximum allowable function duration due to one or more previous function failures and reducing the maximum allowable function duration due to one or more previous successes.

7. The method of claim 1, wherein the time-critical computing function is a function performed in a communication system.

8. The method of claim 7, wherein the time-critical computing function is scheduling a time slot and adjusting the maximum allowable function duration comprises adjusting the starting time relative to the time slot.

9. The method of claim 7, wherein the time-critical computing function is a random access function and adjusting the maximum allowable function duration comprises bringing forward or postponing a deadline for responding to a random access attempt.

10. A system, comprising:
a first node performing a first portion of a time-critical computing function;
a second node performing a second portion of the time-critical computing function; and
a controller for adjusting a maximum allowable function duration to achieve a target function failure rate by adjusting a function starting time by an increment of time that is based on the target function failure rate,
wherein a function failure occurs when the time-critical computing function fails to complete by a function completion deadline, and
wherein the target function failure rate comprises a ratio of a number of function failures to a total number of times the time-critical computing function has been performed.

11. The system of claim 10, wherein the first node and the second node are in physically distinct locations.

12. The system of claim 11, wherein the first and second nodes are connected over backhaul with a positive backhaul delay.

13. The system of claim 10, wherein adjusting the maximum allowable function duration comprises adjusting at least one of the function starting time or the function completion deadline.

14. The system of claim 10, wherein adjusting the maximum allowable function duration comprises adjusting based on success or failure of one or more previous iterations of the time-critical computing function.

15. The system of claim 14, wherein adjusting based on success or failure of one or more previous iterations of the time-critical computing function comprises one of increasing the maximum allowable function duration based on the function failure and reducing the maximum allowable function duration based on function success.

16. The system of claim 10, wherein the time-critical computing function is a function performed in a communication system.

17. The system of claim 16, wherein the communication system is a wireless communication system and the time-critical computing function is one of a wireless uplink or wireless downlink function.

18. The system of claim 17, wherein the time-critical computing function is scheduling a time slot and adjusting the maximum allowable function duration comprises adjusting a starting time relative to the time slot.

19. The system of claim 16, wherein the time-critical computing function is random access and adjusting the maximum allowable function duration comprises bringing forward or postponing a deadline for responding to a random access attempt.

20. A system for achieving a target function failure rate for a time-critical computing function, the system comprising:
a first node performing a first portion of the time-critical computing function;
a second node performing a second portion of the time-critical computing function; and
a controller for adjusting a maximum allowable function duration to achieve the target function failure rate by adjusting a function starting time by an increment of time that is based on the target function failure rate,
wherein the first node and the second node are distributed, and are connected over a backhaul with a non-zero backhaul delay between them,
wherein a function failure occurs when the time-critical computing function fails to complete by a function completion deadline, and
wherein the target function failure rate comprises a ratio of a number of function failures to a total number of times the time-critical computing function has been performed.

* * * * *